US012180850B2

(12) United States Patent
Deneuve et al.

(10) Patent No.: US 12,180,850 B2
(45) Date of Patent: Dec. 31, 2024

(54) METHOD FOR DETECTING A POSSIBLE FUEL LEAK IN AN OIL CIRCUIT OF AN AIRCRAFT ENGINE

(71) Applicant: SAFRAN AIRCRAFT ENGINES, Paris (FR)

(72) Inventors: Sébastien Jean Fernand Deneuve, Moissy-Cramayel (FR); Ruben Abraham Elbaz, Moissy-Cramayel (FR); Alrick Patrick Michel Jacques Verrier, Moissy-Cramayel (FR); Christophe Mathedarre, Moissy-Cramayel (FR); Nicolas Andréa Fabbro, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 597 days.

(21) Appl. No.: 17/435,460

(22) PCT Filed: Mar. 5, 2020

(86) PCT No.: PCT/FR2020/050446
§ 371 (c)(1),
(2) Date: Sep. 1, 2021

(87) PCT Pub. No.: WO2020/188179
PCT Pub. Date: Sep. 24, 2020

(65) Prior Publication Data
US 2022/0178272 A1   Jun. 9, 2022

(30) Foreign Application Priority Data
Mar. 15, 2019   (FR) ...................................... 1902657

(51) Int. Cl.
*F01D 21/00*   (2006.01)
*B64D 45/00*   (2006.01)

(52) U.S. Cl.
CPC ........... *F01D 21/003* (2013.01); *B64D 45/00* (2013.01); *B64D 2045/0085* (2013.01); *F05D 2260/80* (2013.01)

(58) Field of Classification Search
CPC ....... F01D 21/003; F01D 25/18; B64D 45/00; B64D 2045/0085; F05D 2260/80
See application file for complete search history.

(56) References Cited

U.S. PATENT DOCUMENTS 9,830,747 B2 *  11/2017  Apps .......................... G07C 3/08
11,410,056 B1 *  8/2022  Xu ........................... G07C 5/085
(Continued)

FOREIGN PATENT DOCUMENTS

EP   2072762 A1   6/2009
EP   3034840 A1   6/2016
(Continued)

OTHER PUBLICATIONS

International Search Report in International Application No. PCT/FR2020/050446, mailed Jun. 30, 2020 (5 pages).
(Continued)

*Primary Examiner* — Jason Holloway
*Assistant Examiner* — Madison B Emmett
(74) *Attorney, Agent, or Firm* — Bookoff McAndrews, PLLC

(57) ABSTRACT

The invention relates to a method for detecting a possible fuel leak into an oil circuit of an aircraft engine, the aircraft including at least one pair of identical engines equipped with respective oil circuits, the pair of engines being associated with at least one quadruplet of measurements previously acquired in a measurement time during the operation of the engines of the pair and corresponding to a measurement of pressure and a measurement of temperature of the fluid contained in each of the oil circuits of the engines of the pair.

14 Claims, 3 Drawing Sheets

(56) References Cited

U.S. PATENT DOCUMENTS

| | | | | |
|---|---|---|---|---|
| 2009/0164056 | A1* | 6/2009 | Cornet | F01M 1/18 |
| | | | | 701/100 |
| 2016/0178471 | A1* | 6/2016 | Blumrich | G01M 3/025 |
| | | | | 73/49.7 |
| 2017/0124782 | A1* | 5/2017 | Amirapu | G05B 23/024 |
| 2017/0323274 | A1* | 11/2017 | Johnson | G05B 13/041 |
| 2019/0318837 | A1* | 10/2019 | Schwartz | G05B 23/0254 |
| 2020/0118366 | A1* | 4/2020 | Ryan | G07C 5/0816 |
| 2020/0151967 | A1* | 5/2020 | Boggio | G07C 5/006 |
| 2020/0165003 | A1* | 5/2020 | Turner | H02J 50/001 |
| 2021/0071582 | A1* | 3/2021 | Widemann | F01D 19/02 |

FOREIGN PATENT DOCUMENTS

| | | |
|---|---|---|
| EP | 3447260 A1 | 2/2019 |
| FR | 2980238 A1 | 3/2013 |
| GB | 2266964 A | 11/1993 |
| WO | 2013037865 A1 | 3/2013 |

OTHER PUBLICATIONS

French Search Report in French Patent Application No. 1902657, dated Dec. 6, 2019 (2 pages).

\* cited by examiner

[Fig. 1]
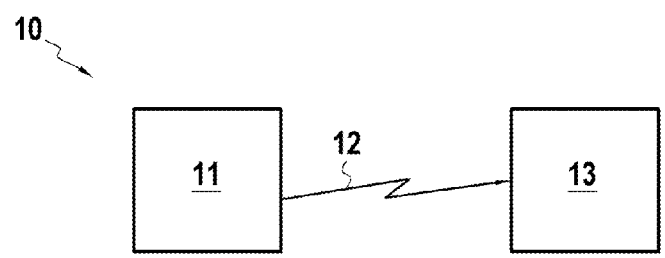
[Fig. 2]
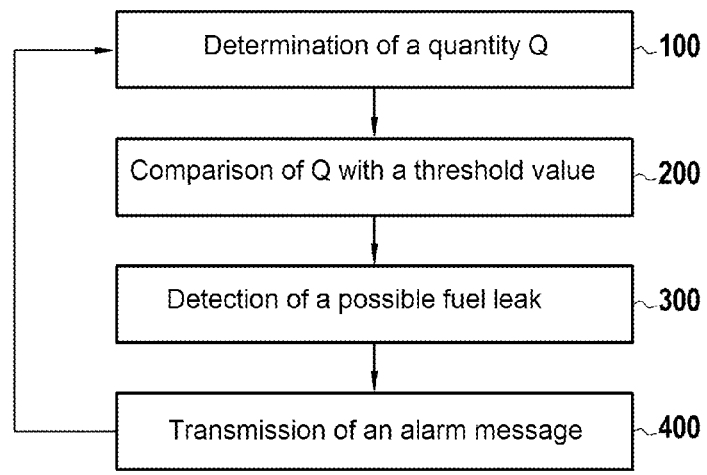

[Fig. 3]
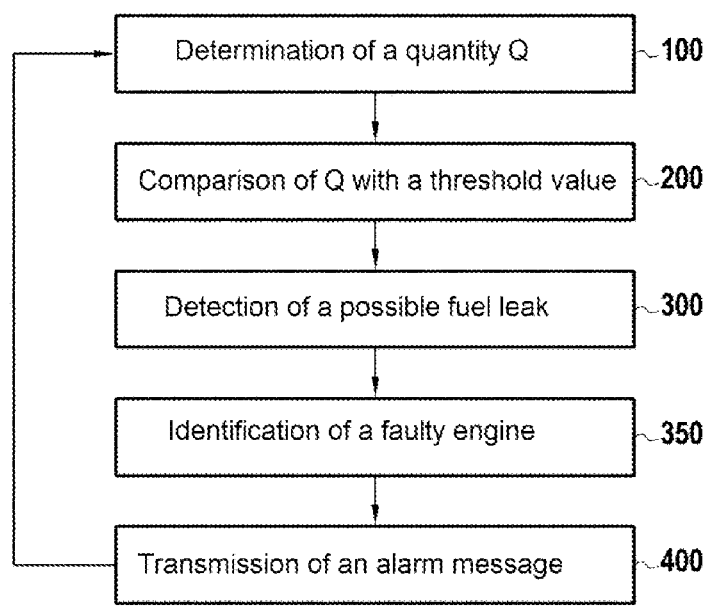

[Fig. 4]
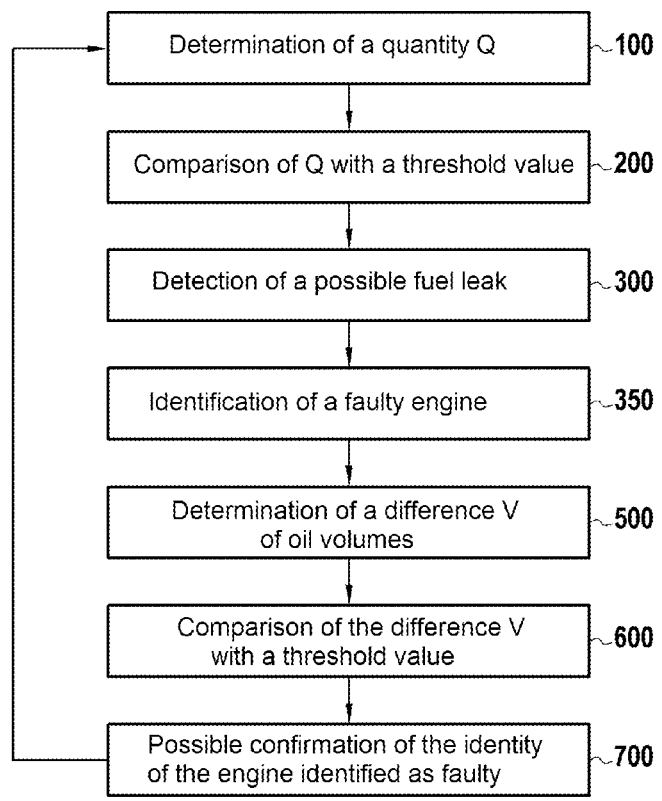

METHOD FOR DETECTING A POSSIBLE FUEL LEAK IN AN OIL CIRCUIT OF AN AIRCRAFT ENGINE

CROSS-REFERENCE TO RELATED APPLICATION(S)

This application is the U.S. national phase entry under 35 U.S.C. § 371 of International Application No. PCT/FR2020/050446, filed on Mar. 5, 2020, which claims priority to French Patent Application No. 1902657, filed on Mar. 15, 2019.

PRIOR ART

The present invention belongs to the field of monitoring the operation of an aircraft engine, when said aircraft includes at least one pair of identical engines. It relates more particularly to a method of detecting a possible fuel leak into an oil circuit of an engine of an aircraft of this type. The invention finds one particularly advantageous application, though it is in no way limiting, in the case of an aircraft including turbomachine type engines.

An aircraft engine includes numerous elements needing to be dynamically lubricated by oil during the operation of the aircraft, such as for example rolling-element bearings, pistons, gearing, etc., this in order to reduce possible friction between the latter.

Here, "dynamic lubrication" refers to lubrication obtained by setting in motion a lubricant, oil in the present case, as opposed to static lubrication, corresponding to constant soaking in a lubricant bath, within which the lubricant is not moved.

In order to provide dynamic lubrication, an aircraft engine conventionally includes an oil circuit. An oil circuit of this type forms a closed circuit including one or more pumps configured to move the oil within the pipes of said oil circuit. The latter also includes a reservoir in which the oil is stored when the engine is not in operation, and in which the oil is pumped to move it in circulation in the pipes.

Besides the fact of being configured to allow a circulation of oil, the oil circuit also has the function, via said oil circulation and its physio-chemical aspects, of regulating the temperature of the elements of the engine set in motion during the operation of the aircraft, particularly rolling-element bearings. "Regulating the temperature" refers here to the fact of removing calories, or, to put it yet another way, of cooling.

The lubrication and the thermal regulation provided by the oil are vital for the proper operation of the engine. As regards more specifically thermal regulation, it generally takes place in heat exchangers installed within the engine. These exchangers are of the oil-fuel type, so that the oil circuit is in contact with the fuel circuit of the engine. Thus, the oil is cooled by the fuel, which is stored in a dedicated reservoir at low temperature.

In the case where a leak would appear at an interface (such as a seal, a wall, etc. for example) between the oil circuit and the fuel circuit, fuel would leak into the oil circuit and contaminate the latter, due to the fact that the pressure in the fuel circuit is greater than that in the oil circuit.

A fuel leak of this type into the oil circuit is problematical. In fact, it degrades the lubrication and cooling performance of the oil. More specifically, in the event of a leak, the temperature of the fluid (a mixture of oil and fuel) then contained in the oil circuit increases, and therefore cools the engine less well. Moreover, as said temperature increases, the pressure of the fluid consequently decreases. Such conditions, in the most unfavorable cases (large and/or prolonged leak for example), can lead to ignition of the mixture of oil and fuel, and thus cause a fire in the engine.

It is therefore understood that it is imperative to be able to detect as early as possible a fuel leak of this type into the oil circuit when it occurs. Nevertheless, and until very recently, there was no means of detecting this leak phenomenon, essentially due to its rarity, and therefore the few data available to characterize it. The monitoring implemented aimed above all to detect, by means of dedicated sensors, the consequences of a leak of this type, such as for example the ignition of a fire, and were therefore remedial at best.

In document FR 2 980 238, a solution was proposed to attempt to calculate a fuel leak into the oil circuit. This solution consists of monitoring automatically and continuously the possible variations of the fluid level, or equivalently the variations of fluid volume, in the oil circuit, depending on the operating conditions of the engine, such as for example the identification of a deceleration of the engine speed in particular. Thus, if said fluid level increases during the operation of the aircraft, there is reason to suspect a possible fuel leak.

However, despite the advantages that this solution procures, there exists a need to improve the detection of a fuel leak into an oil circuit.

In fact, there exists a need to further simplify implementation by making leak detection independent of the operating conditions induced by the trajectory of the aircraft. There also exists a need to further improve the accuracy of the leak detection by limiting as much as possible the cases of a false breakdown detection, or conversely, of non-detection of an actual breakdown. There also exists a need to limit the costs and simplify the installation by avoiding in particular, as much as possible, the use of expensive dedicated sensors that are complex to install given the strong structural dimensioning constraints of the engine, particularly in the case of turbomachines.

DISCLOSURE OF THE INVENTION

The present invention has as its object to correct all or a part of the disadvantages of the prior art, particularly those disclosed above, by proposing a solution which allows detecting, in a simple and accurate manner, a possible fuel leak into an oil circuit of an engine of an aircraft which includes a plurality of engines, while freeing itself of the operating conditions induced by the trajectory of the aircraft, as well as avoiding any material reconfiguration of the engines of the aircraft.

To this end, and according to a first aspect, the invention relates to a method for detecting a possible fuel leak into an oil circuit of an aircraft engine, said aircraft including at least one pair of identical engines equipped with respective oil circuits, said pair of engines being associated with at least one quadruplet of measurements previously acquired in a measurement time during the operation of the engines of the pair and corresponding to a measurement of pressure and a measurement of temperature of the fluid contained in each of the oil circuits of the engines of the pair. In addition, said detection method includes:

a step of determining a quantity Q representative of a possible operating difference between the engines of the pair, based on the measurement quadruplet, a step of comparing the quantity Q with a previously determined threshold value, so as to obtain a comparison result, a step of detecting a possible fuel leak into the oil circuit of one of the engines of the pair, based on the comparison result.

The fact of seeking a possible operating difference between the engines of the pair, based on the measurement quadruplet, advantageously allows freeing itself from the operating conditions induced by the trajectory of the aircraft. In fact, the detection of a possible leak according to the invention is carried out in connection with the study of the parameters (pressure, temperature) at a particular measurement time, and not in connection with the study of the variation of one or more parameters at a plurality of measurement times. The two engines of the pair thus form a measurement baseline evaluated at a given measurement time, the operation of one of the engines being determined depending on the operation of the other engine.

Moreover, the fact of considering the measurements of pressure and of temperature in each of the oil circuits of the engines of the pair allows accurate evaluation of a possible operating difference. In fact, measurements of this type are conventionally carried out by means of pressure and temperature sensors, the design of which is largely mastered. These sensors are in addition of low cost as well as easily integrable in the engines. In other words, it is not necessary to implement expensive and complex sensors such as those able to take into account the altitude of the engine in flight, possible dilation of the oil, etc.

Finally, the implementation of the method does not require any material reconfiguration of the engines of the aircraft, given that the measurements of pressure and of temperature can be carried out by means already conventionally equipping any engine.

Generally, all of steps of the method can be implemented by a processing device external to the engines, located for example in a ground station, so that there exists no need to modify the material configuration of the engines.

In particular modes of implementation, the detection method can also include one or more of the following features, taken in isolation or in any technically possible combination.

In particular embodiments, the step of determining the quantity Q includes:
  calculation of a first quantity $Q_1$ representative of a pressure gap between the two engines, based on the measurements of pressure of the quadruplet,
  calculation of a second quantity $Q_2$ representative of a gap in temperature between the two engines, based on the measurements of temperature of the quadruplet,
  calculation of the quantity Q based on the quantities $Q_1$ and $Q_2$.

The determination of the gaps according to the calculation of the quantities $Q_1$ and $Q_2$ is particularly simple to implement, and allows comparing the parameters of the same unit to one another. Moreover, it does not necessitate powerful means of calculation, thus allowing a rapid determination of the quantity Q.

In particular modes of implementation, the quantity Q is calculated according to the following formula:

$$Q=\sqrt{Q_1^2+Q_2^2},$$

where:
  $Q_1$ is calculated equal to the difference between the measurements of pressure of the quadruplet,
  $Q_2$ is calculated equal to the difference between the measurements of temperature of the quadruplet.

In particular modes of implementation, said method includes, after the step of determining the quantity Q and before the comparison step, as step of updating the quantity Q in which the updated quantity Q corresponds to the absolute value of the quantity Q previously determined.

The fact of updating the quantity Q by calculating its absolute value allows simplifying the management of the threshold value to be considered during the comparison step, all the numbers considered, namely the quantity Q and the threshold value, being in fact positive.

In particular modes of implementation, said method includes, consecutively with the detection step and when a leak is detected, a step of transmitting an alarm message.

In particular modes of implementation, said method includes, consecutively with the detection step and when a leak is detected, a step of identifying a faulty engine among the engines of the pair, said identification step comprising:
  a comparison of the measurements of pressure and/or a comparison of the measurements of temperature of the quadruplet, associated respectively with the engines of the pair,
  an identification of a faulty engine based on said comparison of the measurements of pressure and/or said comparison of the measurements of temperature.

In particular modes of implementation, when an alarm message is transmitted, said alarm message includes an identifier of the identified faulty engine.

In particular modes of implementation, each engine of the pair is also associated with at least two measurements of the fluid volume contained in the oil circuit of said engine of the pair and previously acquired in two distinct respective measurement times during the operation of the aircraft, one measurement time prior to the takeoff of the aircraft and one measurement time subsequent to the landing of the aircraft. In addition, said method includes, for at least one engine of the pair:
  a step of determining a gap V between the two measurements of fluid volume associated with said engine,
  a step of comparing the gap V with a threshold value determined based on a theoretical average oil consumption of the faulty engine and on a duration separating said distinct measurement times, and, following said identification step:
  a step of possible confirmation, based on the result of the comparison of the gap V with the threshold value, of the identity of the engine identified as faulty.

The implementation of these steps of determining a gap V, of comparing this gap V with a threshold value, and possibly confirming, advantageously allows carrying out an additional verification of the possible presence of a fuel leak into an aircraft engine.

Thus, when a fuel leak has been detected in an engine, on the basis of measurements of pressure and of temperature, another detection of this leak on the basis of additional measurements of fluid volume allows confirming said leak. Proceeding in this manner allows increasing the robustness of the detection of a leak.

In particular modes of implementation, several measurement quadruplets are considered, at least the steps of determining a quantity Q, of comparing the quantity Q with a threshold value and of detecting a possible leak being iterated for each of said measurement quadruplets.

In particular modes of implementation, the aircraft includes several pairs of identical engines, at least the steps of determining a quantity Q, of comparing the quantity Q with a threshold value and of detecting a possible leak being iterated for each of said pairs.

According to a second aspect, the invention relates to a computer program including a set of program code instructions which, when they are executed by a processor, configure said processor to implement a detection method according to the invention.

According to a third aspect, the invention relates to a recording medium readable by a computer, on which is recorded a computer program according to the invention.

According to a fourth aspect, the invention relates to a processing device for detecting a possible fuel leak into an oil circuit of an aircraft engine, said aircraft including at least one pair of identical engines equipped with respective oil circuits, said pair of engines being associated with at least one quadruplet of measurements previously acquired in a measurement time during the operation of the engines of the pair and corresponding to a measurement of pressure and a measurement of temperature of the fluid contained in each of the oil circuits of the engines of the pair. In addition, the processing device includes:

- a determination module, configured to determine a quantity Q representative of a possible operating difference between the engines of the pair, based on the measurement quadruplet,
- a comparison module, configured to compare the quantity Q with a previously determined threshold value, so as to obtain a comparison result,
- a detection module, configured to detect a possible fuel leak into the oil circuit of one of the engines of the pair, based on the comparison result.

In particular embodiments, the processing device can also include one or more of the following features, taken in isolation or in any technically possible combination.

In particular embodiments, said device includes an identification module configured, when a leak is detected, to:

- compare the measurements of pressure and/or the measurements of temperature of the quadruplet associated respectively with the engines of the pair,
- identify a faulty engine based on said comparison of the measurements of pressure and/or said comparison of the measurements of temperature.

In particular embodiments, each engine of the pair is also associated with at least two measurements of the fluid volume contained in the oil circuit of said engine of the pair and previously acquired in two respective distinct measurement times during the operation of the aircraft, one measurement time prior to the takeoff of the aircraft and one measurement time subsequent to the landing of the aircraft. In addition, said device includes:

- a determination module, configured to determine a gap V between the two measurements of fluid volume associated with one engine of the pair,
- a comparison module, configured to compare the gap V with a threshold value determined based on a theoretical average oil consumption of the faulty engine and on a duration separating said distinct measurement times,
- a confirmation module, configured to possibly confirm, based on the result of comparing the gap V with the threshold value, the identity of the engine identified as faulty.

According to a fifth aspect, the invention relates to a system for detecting a possible fuel leak into an oil circuit of an aircraft engine, said aircraft including at least one pair of identical engines equipped with respective oil circuits. In addition, said detection system includes:

- acquisition means configured to acquire at least one measurement quadruplet in a measurement time during the operation of the engines of the pair and corresponding to a measurement of pressure and a measurement of temperature of the fluid contained in each of the oil circuits of the engines of the pair,
- a processing device according to the invention,
- means of communicating the measurement quadruplet to the processing device.

In particular embodiments, said acquisition means are also configured to acquire, for each engine of the pair, at least two measurements of the fluid volume contained in the oil circuit of said engine in two distinct respective measurement times during the operation of the aircraft, one measurement time prior to the takeoff of the aircraft and one measurement time subsequent to the landing of the aircraft, said processing device being in conformity with the invention, and the communication means also being configured to transmit the measurements of fluid volume to the processing device.

According to a sixth aspect, the invention relates to an aircraft including a detection system according to the invention.

BRIEF DESCRIPTION OF THE DRAWINGS

Other features and advantages of the present invention will be revealed by the description given below, with reference to the appended drawings which illustrate an embodiment of it free of any limiting character. In these figures:

FIG. 1 shows schematically an exemplary embodiment of a detection system of a possible fuel leak into an oil circuit of an aircraft engine according to the invention, said aircraft including at least one pair of identical engines;

FIG. 2 shows a flowchart of a mode of implementation of a detection method of a possible fuel leak into an oil circuit an engine of said aircraft according to the invention, based on measurements of pressure and of temperature;

FIG. 3 shows a preferred mode of implementation according to the invention of the method of FIG. 2, during which, when a leak is detected, a faulty engine is identified among the engines of the aircraft;

FIG. 4 shows a preferred mode of implementation of the detection method according to the invention, based on a measurements of pressure, temperature and fluid volume, and during which, when a faulty engine has been identified, a possible confirmation of the identification of this faulty engine is sought.

DESCRIPTION OF EMBODIMENTS

The present invention finds its place in the field of monitoring the operation of an aircraft engine, for an aircraft (not shown in the figures) including at least one pair of identical engines.

Conventionally, each aircraft engine is equipped with an oil circuit, so that the aircraft includes as many engines as oil circuits. The oil circuit of each engine forms a closed circuit including one or more pumps configured to set the oil in motion within the pipes of said oil circuit. The latter also includes a reservoir in which the oil is stored when the engine that it equips is not in operation, and in which the oil is pumped for circulation in the pipes.

The oil circuit of an aircraft engine is also in contact, at a plurality of interfaces, such as for example seals, walls, equipment, etc., with a fuel circuit of said engine.

FIG. 1 shows schematically an exemplary embodiment of a system 10 for detecting a possible fuel leak into an oil circuit of an aircraft engine.

The description hereafter considers more specifically, but in a manner that is in no way limiting, an aircraft of the airplane type equipped with two identical engines of the turbine engine type, such as turboprops for example. Inasmuch as the aircraft includes a pair of engines, the number of oil circuits is consequently also equal to two, these oil circuits also being identical with one another.

Nothing excludes, however, following other examples not detailed here, considering other types of turbine engines, such as a turbojet for example, but also, and more generally, engines which are not turbine engines, such as piston engines for example. The invention is in fact applicable to any type of engine for which it is desired to monitor any possible contamination of its oil circuit by fuel. Nothing also excludes considering an aircraft of another type, such as a helicopter for example.

Moreover, it must be noted that no limitation is attached to the number of pairs of identical engines of the aircraft. For example, the aircraft can include two pairs of engines, so as to be equipped with a total of four engines which can either all be identical with one another (in other words the pairs are identical to one another), or correspond to two pairs that are different from one another, the engines within the same pair nevertheless being identical with one another. Finally, nothing excludes the aircraft from also comprising, instead of one or more pairs of identical engines, one or more engines which, considered individually, differ from all the other engines.

The detection system 10 includes acquisition means 11 configured to acquire measurements of pressure and measurements of temperature of the fluid contained in each of the oil circuits of the engines of said pair.

By "fluid" contained in an oil circuit, reference is made here to a liquid circulating in the pipes of said circuit. Under nominal operating conditions, i.e. when no fuel leak affects an oil circuit, the fluid contained in the oil circuit corresponds of course solely to oil. On the contrary, when a fuel leak occurs, the liquid contained in the oil circuit corresponds to a mixture of oil and of fuel.

It is worth noting that under nominal operating conditions, the respective oil pressures and temperatures in each of the oil circuits are substantially identical and undergo the same changes. This results from the fact that the engines of the pair receive identical commands, such as movement commands during taxiing, flight commands during the cruise phase, etc., and are therefore expected to be subjected to the same operating conditions.

For example, the acquisition means 11 include dedicated sensors for each type of measurement, each engine then including a pressure sensor and a temperature sensor, also called a temperature probe. Sensors of this type can be selected depending on the oil used, as well as the characteristics and dimensioning of the engines.

It is noted that the oil pressure corresponds to a relative pressure, displayed for example on the instrument panel of the airplane in PSI units (acronym of the expression "pounds per square inch"). The temperature, for its part, is for example displayed in degrees Celsius or in degrees Fahrenheit.

The measurements acquired by the acquisition means 11 are accomplished in at least one measurement time during the operation of the engines of the aircraft. By "operation of the engines of the aircraft," reference is made here to the fact that the engines of the aircraft have been started. A configuration of this type covers of course the taxiing phases before and after landing, the cruise phase, but also the phases during which the aircraft has not yet left its parking space prior to takeoff or has already reached its parking space after landing, its engines nevertheless being in operation.

Thus, a measurement quadruplet is associated with each measurement time, this measurement quadruplet corresponding to a measurement of pressure and to a measurement of temperature of the fluid contained in each of the oil circuits of the engines of said pair.

Preferably, the acquisition means 11 of the detection system 10 are also configured to acquire, in addition to the measurements of pressure and of temperature, and for each engine of the pair, at least two measurements of the fluid volume contained in the oil circuit of the engine considered at two respective distinct measurement times. For example, besides the pressure and temperature sensors, the acquisition means 11 also include sensors dedicated to the measurement of volume, typically level probes. It is noted that the measurements of fluid volume do not require that the engines of the aircraft be in operation, and correspond conventionally to the fluid volumes respective contained in the reservoirs of the engines.

It should be noted that, in this preferred embodiment, no limitation is attached to the measurement times at which the measurements of fluid volume are performed. More particularly, nothing excludes that the measurement times associated with said measurement quadruplets are at least partly, or all different from the measurement times associated with the volume measurements.

When the measurements have been acquired by the acquisition means 11 of the detection system 10, these measurements are transmitted, by means of the communication means 12 of the detection system 10, between said acquisition means 11 and a processing device 13 which is also part of the detection system 10. Once these measurements are received by the processing device 13, it can perform processing seeking to detect a possible fuel leak into an oil circuit of one of the engines of the pair, by implementing a method of detection such a possible leak.

The processing device 13 includes for example one or more processors and storage means (magnetic hard disk, electronic memory, optical disk, etc.) in which data and a computer program are stored, in the form of a set of program code instructions to be executed to implement all or part of the steps of the method for detecting a possible leak. Alternatively or in addition, the processing device 13 also includes one or more programmable logic circuit(s), of the FPGA, PLD etc. type and/or specialized integrated circuits (ASIC), and/or a set of discrete electronic components, etc. adapted to implement all or part of the steps of the method for detecting a possible leak.

In other words, the processing device 13 includes a set of means configured as software (specific computer program) and/or hardware (FPGA, PLD, ASIC, etc.) to implement the different steps of the method for detecting a possible leak.

In a first variant embodiment of the invention, the processing device 13 is located on the ground, for example in the premises of the manufacturer of the engines equipping the aircraft, or in the premises of the airline to which the aircraft belongs, or in the premises of an airport dedicated to the analysis of flights leaving/arriving at this airport.

Thus, according to this first variant embodiment, said communication means 12 or configured to transmit the measurements acquired within the aircraft to the processing device 13 on the ground. For example, said communication means 12 comprise ACARS units (acronym of "Airline Communications, Addressing and Reporting System"), equipping respectively the aircraft and the processing device 13, and configured to communicate using the ARINC (acronym of "Aeronautical Radio Incorporated") standard.

According to a second variant embodiment, the processing device 13 is integrated with the aircraft. In this case, said communication means 12 are for example wired or wireless, and configured to transmit the measurements acquired to the processing device 13 according to any suitable communication protocol. No limitation is attached to the selection of wired or wireless transmission, or to a particular communication protocol.

The processing performed by the processing device 13 to detect a possible fuel leak into an oil circuit of one of the engines of the pair can be accomplished in real time or in deferred time.

For example, when several measurement quadruplets are transmitted, resulting from measurements accomplished at several measurement times, the processing device 13 implements the detection method at each reception of one of the quadruplets. Alternatively, all or part of the quadruplets are recorded in the storage means of the processing device 13, and analyzed in deferred time via said detection method.

According to another example, the detection system 10 includes auxiliary storage means, such as for example a database stored on a local server on the ground. These storage means are not integrated in the processing device 13, and receive measurements acquired, for example by means of the transmissions of an ACARS unit, to store them and only then transmit them to the processing device 13 for the purpose of their analysis.

The continuation of the description seeks to detail the main steps of the method for detecting a possible fuel leak into an oil circuit of one of the engines of the pair. In order to simplify said description, and unless otherwise stated, the situation in which a single measurement quadruplet has been transmitted to the processing device 13 is considered first of all. The case where measurements of fluid volume are also transmitted is considered subsequently with reference to a preferred mode of implementation of the method.

To put it another way, a single measurement time is considered, for example a measurement time subsequent to the landing of the aircraft. The two engines of the pair are respectively denoted $M_1$ and $M_2$. The quadruplet, for its part, is denoted $(P_1, F_2, T_1, T_2)$, where:

- $P_1$ and $T_1$ correspond to respective measurements of pressure and of temperature of the fluid in the oil circuit of the engine $M_1$,
- $P_2$ and $T_2$ correspond to respective measurements of pressure and of temperature in the oil circuit of the engine $M_2$.

The selection of a particular measurement time during the operation of the engines constitutes only a variant embodiment of the invention. Consequently, nothing excludes said measurement time corresponding to a taxiing phase, a cruise phase or to the parking of the aircraft, provided that the engines of the pair are in operation.

Moreover, it is appropriate to note that the number of quadruplets considered, and therefore ultimately the number of measurement times considered, do not constitute a limitation of the invention. The same is true as regards the number of pairs of identical engines of the aircraft. This point is considered subsequently with reference to particular modes of implementation of the method.

FIG. 2 shows a flowchart of a mode of implementation of the method for detecting a possible fuel leak into an oil circuit of one engine of the pair, based on measurements of pressure and of temperature.

The detection method includes several steps. In its general principle, the method consists first of all in quantifying, based on the measurement quadruplet $(P_1, F_2, T_1, T_2)$, a possible operating difference between the engines $M_1$ and $M_2$ of the pair. This quantification is carried out via the calculation of a metric representing the phenomenon considered (leakage of fuel into an oil circuit), this metric then serving as a decision criterion regarding the existence, or not, of a fuel leak.

To this end, the detection method includes, first of all, a step 100 of determining a quantity Q representative of a possible operating difference between the engines $M_1$ and $M_2$ of the pair, based on the measurement quadruplet $(P_1, F_2, T_1, T_2)$.

What is referred to as "quantity Q" is the fact that Q is a real number.

The fact of searching for a possible operating difference between the engines of the pair, based on the measurement quadruplet, advantageously allows freeing itself from the operating conditions induced by the trajectory of the aircraft. In fact, the detection of a possible leak in this mode of implementation is carried out in connection with the study of the parameters, which are the pressure and the temperature, at a single measurement time, and not in relation with the study of the variation of one or more parameters at a plurality of measurement times. The two engines $M_1$ and $M_2$ thus form a measurement baseline evaluated at a given measurement time, the operation of one of the engines being determined depending on the operation of the other engine.

Moreover, the fact of considering measurements of pressure $P_1$, $P_2$ and of temperature $T_1$, $T_2$ in each of the oil circuits of the engines of the pair allows evaluating accurately a possible operating difference. The design of the pressure and temperature sensors is in fact largely mastered, thus allowing very accurate measurements to be carried out.

Finally, it is also understood that the implementation of the method does not necessitate any material reconfiguration of the engines of the aircraft, given that the acquisition means 11 are already present in any construction of this type, and that the processing device 13, when it is integrated with the aircraft, can be located outside said engines, in the cockpit for example.

In one particular mode of implementation, the step of determining the quantity Q includes the calculation of a first quantity $Q_1$ representative of a gap in pressure between the two engines $M_1$ and $M_2$, based on the measurements of pressure $P_1$ and $P_2$ of the quadruplet. It also includes the calculation of a second quantity $Q_2$ representative of a gap in temperature between the two engines $M_1$ and $M_2$, based on the measurements of temperature $T_1$ and $T_2$ of the quadruplet. Finally, the quantity Q is calculated based on the quantities $Q_1$ and $Q_2$.

The determination of gaps resulting from the calculation of the quantities $Q_1$ and $Q_2$ is particularly simple to implement, and allows comparing parameters (pressure, temperature) of the same unit to one another. Moreover, it does not necessitate powerful means of calculation, thus allowing a rapid determination of the quantity Q.

The selection of a determination of the quantity Q by the calculation of said quantities $Q_1$ and $Q_2$ constitutes only one implementation variant of the invention. Thus, nothing excludes determining the quantity Q by another means, for example on the basis of calculations involving products (in the sense of multiplication) between pressures and temperatures, for example $P_1 \times T_1$ and $P_2 \times T_2$, or products between pressures and products between temperatures, for example $P_1 \times P_2$ and $T_1 \times T_2$.

More generally, the selection of a particular determination of the quantity Q depends, in particular, on the threshold values to which it is compared, as described below. Thus, if homogeneous threshold values are available of the product of a pressure by a temperature, resulting for example from calculations performed based on regularly logged measurements during aircraft flights or even resulting from numerical simulations, the determination of the quantity Q is performed in correspondence with the units of these threshold values.

In one preferred example of implementation, the quantity Q is calculated according to the following formula:

$$Q=\sqrt{Q_1^2+Q_2^2},$$

where:
- $Q_1$ is calculated equal to the difference between the measurements of pressure of the quadruplet, i.e. equal to $P_1-P_2$ (or $P_2-P_1$, the order of subtraction not constituting a limitation),
- $Q_2$ is calculated equal to the difference between the measurements of temperature of the quadruplet, i.e. equal to $T_1-T_2$ (or $T_2-T_1$, the order of subtraction not constituting a limitation).

It is appropriate to note that calculating the quantity Q in this manner amounts to determining the norm of a vector, the components of which are $Q_1$ and $Q_2$. To say it yet another way, Q corresponds to the calculation of the quadratic norm $L^2$ of this vector. It is therefore understood that under nominal operating conditions, the norm of this vector is substantially zero, given that the quantities $Q_1$ and $Q_2$ are respectively substantially zero. However, once the pressure $P_1$ differs from the pressure $P_2$ and/or the temperature $T_1$ differs from the temperature $T_2$, the norm of this vector allows quantifying the operating gap between the two engines of the pair, thus forming a metric characteristic of the phenomenon of a fuel leak into the oil circuit of one of said engines. In other words, the more the quantity Q thus calculated is high, the greater the probability of the existence of a leak, and the more likely that the magnitude of the possible leak is also large. The phrase "magnitude of the leak" refers here to the flow rate of fuel contaminating the affected oil circuit.

Nothing excludes, however, following other examples not detailed here, calculating the quantity Q in a different manner. For example, it is possible to consider a quantity $Q_1$ (respectively $Q_2$) representative of a pressure gap (respectively a temperature gap) provided with a weighting coefficient, the respective weighting coefficients of the quantities $Q_1$ and $Q_2$ being different. According to another example, possibly taken in combination with the preceding seeking to weight the quantities $Q_1$ and $Q_2$, it is also possible to consider a quantity Q corresponding to the calculation of the norm LP (Lebesgue space with index p), with p an integer greater than or equal to 1, of the vector the components of which are $Q_1$ and $Q_2$.

Consequently, following step 100, the detection method supplies the quantity Q, so that it becomes possible to evaluate of a fuel leak actually affects one of the two engines $M_1$ et $M_2$.

To this end, the method includes a step 200 of comparing the quantity Q with a previously determined threshold value, so as to obtain a comparison result.

The phrase "comparison with a threshold value" refers here to the fact of determining if the quantity Q is less than or greater than said threshold value. The comparison result therefore corresponds to the fact that the quantity Q is less than or greater than the threshold value.

The threshold value corresponds, for example, to a value obtained as a result of a test campaign. According to another example, the threshold value is fixed as a result of numerical simulations modeling the operation of the engines of the aircraft.

Generally, the selection of a threshold value depends on the desired tolerance against possible false leak detections. To say it yet another way, the threshold value is representative of the accepted tolerance relative to possible variations of the quantity Q. It is understood in fact that, in the case where the quantity Q is calculated so as to be a number greater than or equal to zero, the more the threshold value is close to the lower bound of the quantity Q, the greater the risk of obtaining false detections via the detection method.

For example, in the case where the quantity Q, as previously described, equal to the quadratic norm $L^2$ of the vector the components of which are $Q_1$ and $Q_2$, setting the threshold value equal to zero amounts to considering a large tolerance against possible false leak detections. In fact, upon the slightest variation of pressure and/or of temperature, the quantity becomes strictly positive, and therefore greater than the threshold value. Conversely, setting a threshold value that is too high can lead to not taking into account certain variations of pressure and/or of temperature between the oil circuits of the engines, and therefore ultimately not detecting a fuel leak, even though it has actually occurred.

A person skilled in the art will know how to adjust the threshold valued depending on the tolerance being sought, for example by taking into account the respective ranges of variation of the sensors.

In one particular mode of implementation, the method includes, after the step 100 of determining the quantity Q and before the comparison step 200, a step of updating the quantity Q in which the updated quantity Q corresponds to the absolute value of the quantity Q previously determined.

In fact, nothing excludes the quantity Q being determined during the step 100 so as to correspond to a negative number. For example, the quantity Q can be determined according to the following formula:

$$Q=-\sqrt{Q_1^2+Q_2^2},$$

where $Q_1$ and $Q_2$ are calculated according to formulations identical to those describe above, i.e. respectively equal to $P_1-P_2$ (or $P_2-P_1$) and to $T_1-T_2$ (or $T_2-T_1$). Therefore, and according to this example, the fact of updating the quantity Q by calculating its absolute value allows simplifying the management of the threshold value to be considered during the comparison step 200. It is understood in fact that inasmuch as the updated quantity Q is necessarily greater than or equal to zero, the threshold value to be considered for said updated quantity Q must also be greater than or equal to zero.

The detection method then includes a step 300 of detecting a possible fuel leak into the oil circuit of one of the engines of the pair, based on the comparison result.

Detection occurs, based on the comparison result.

For example, in the case where the quantity Q is calculated, as described previously, equal to the quadratic norm $L^2$ of the vector the components of which are $Q_1$ and $Q_2$, and possibly updated so that it corresponds to a quantity greater than or equal to zero, a leak into one of the oil circuits of the pair of engines is detected when the quantity Q is greater than the threshold value. Conversely, if said quantity Q is less than said threshold value, no leak is detected.

It is noted that the detection of a possible leak corresponds here to a comparison between numerical quantities (quantity Q and threshold value). In other words, at this stage of the detection method, the information according to which a possible leak has occurred corresponds to digital information, typically expressed in the form of digital bits, which is for example recorded by the storage means of the processing device 13 to be analyzed in real time or in deferred time.

In a particular mode of implementation, illustrated by FIG. 2, the method includes, consecutively with the detection step 300 and when a leak is detected, a step 400 of transmitting an alarm message.

An alarm message of this type can be transmitted in any form whatever, the selection of a particular transmission form constituting only an implementation variant of the invention. For example, the message can be transmitted in text format in order to be displayed by display means such as a computer screen, a tablet, a smartphone, an instrument panel gauge of the aircraft. According to another example, the alarm message is transmitted in audio format.

The transmission of the alarm message advantageously allows warming an operator, such as a pilot, a member of the ground maintenance personnel, etc. For example, the pilot of the aircraft, once warned of the detection of a leak, can then consider shortening the flight time, or even not taking off if that is possible.

It is noted that the transmission of the alarm message can occur in real time, as soon as the leak is detected, or in deferred time, for example once the aircraft has landed.

FIG. 3 shows a preferred mode of implementation of the method of FIG. 2 during which, when a leak is detected, a faulty engine is identified among the engines of the pair.

As illustrated in FIG. 3, the method includes, consecutively with the detection step 300 and when a leak is detected, a step 350 of identifying a faulty engine among the engines of the pair.

This step 350 includes, first of all, a comparison of the measurements of pressure and/or a comparison of the measurements of temperature of the quadruplet, associated respectively with the engines of the pair.

Under nominal operating conditions, and as described above, the pressures $P_1$ and $P_2$ (respectively the temperatures $T_1$ and $T_2$) are substantially equal. On the other hand, in the event of a fuel leak into an oil circuit, the temperature of the fluid contained in said oil circuit increases, and therefore cools the engine associated with said oil circuit less well. Consequently, the temperature increases, and therefore the pressure of the fluid decreases, so that it is possible to determine which engine is faulty by comparing the measurement of pressure or of temperature which is associated with it with the corresponding measurement of the other engine.

Thus, once the measurements of pressure and/or measurements of temperature are compared to one another, the step 350 includes an identification of a faulty engine based on said comparison of the measurements of pressure and/or said comparison of the measurements of temperature.

For example, in the case where the comparison consists of comparing the measurements of pressure to one another, a determination is made as to which of the pressures $P_1$ or $P_2$ is less than the other. If $P_1$ is less than $P_2$, that signifies that the engine $M_1$ is faulty, and vice versa.

Alternatively, in the case where the comparison consists of comparing the measurements of temperature to one another, a determination is mad as to which of the temperatures $T_1$ or $T_2$ is less than the other. If $T_1$ is greater than $T_2$, that signifies the engine $M_1$ is faulty, and vice versa.

According to yet another alternative, the measurements of pressure are compared to one another and the measurements of temperature are compared to one another. In this manner, it is possible to check the correspondence between the identifications issued respectively from the comparison of the measurements of pressure and from the comparison of the measurements of temperature. Proceeding in this manner therefore allows increasing the robustness of the identification of the faulty engine.

The identification of the engine affected by the fuel leak allows generating information, including for example an identifier of the faulty engine and which, when it is transmitted to an operator, for example by a transmitted alarm message, leads to a more accurate identification of the leak. In this manner, the operator can, depending on the operational context, implement an action plan seeking to minimize or repair the fuel leak.

For example, when the processing device 13 is on the ground and the alarm message is transmitted in text format to display means checked by a maintenance operator for the engines of the aircraft, this operator is able, once the aircraft is on the ground and once the alarm message is read, to implement the maintenance operations seeking to repair the leak by accurately targeting the faulty engine. Thus, said operator is not required to carry out the preliminary inspections seeking to identify the faulty engine.

Nothing excludes, however, that the step 350 of identifying the faulty engine is carried out without any alarm message being transmitted.

FIG. 4 shows a preferred mode of implementation of the detection method, based on pressure, temperature and fluid volume measurements and during which, when a faulty engine has been identified, a possible confirmation of the identification of this engine is sought.

In this preferred mode of implementation, it is considered that the acquisition means 11 of the detection system 10 have acquired, for each engine of the pair ($M_1$, $M_2$), at least two measurements of the fluid volume contained in the oil circuit of said engine at two respective distinct measurement times during the operation of the aircraft. Thus, each of the engines of the pair is associated with two measurements of the fluid volume contained in its oil circuit.

The two measurement times associated with one engine of the pair correspond respectively to one measurement time prior to the takeoff of the aircraft and one measurement time subsequent to the landing of the aircraft. According to a more specific example, these measurement times occur when the aircraft in is in the taxiing phase, respectively before takeoff and after landing.

It is considered, without limitation, that the measurement times prior to takeoff (respectively after landing), and associated respectively with the engines of the pair, coincide with each other.

It is also considered, for this preferred mode of implementation, that a fuel leak has been detected in one of the two engines of the pair, following step 300, and that in addition the faulty engine has been identified as such following step 350.

Therefore, and as illustrated in FIG. 4, the detection method includes, following the step 350 of identifying the faulty engine, a step 500 of determining a gap V between the two measurements of fluid volume associated with said engine.

For example, said gap V is determined by subtracting the measurements of fluid volume associated with the faulty engine. No limitation is attached to the order in which said subtraction is carried out, the selection of a particular order having consequences similar to those already described above in relation with the comparison of the quantity Q with a threshold value during the step 200. Advantageously, said gap V corresponds to the absolute value of a subtraction of the measurements of fluid volume.

It is appropriate to note that the fact of selecting measurement times corresponding respectively to a measurement time prior to the takeoff of the aircraft and a measurement time subsequent to the landing of the aircraft is particularly advantageous. Proceeding in this way allows comparing fluid volumes outside of the cruise phase, so as to avoid any bias linked to flight conditions. In fact, the fact of considering the aircraft on the ground allows ensuring that the measurements are carried out under equivalent conditions for the engine for which it is sought to determine whether it is faulty.

The method then includes a step 600 of comparing the gap V with a predetermined threshold value based on a theoretical average oil consumption of the faulty engine and on a duration separating said distinct measurement times.

It is noted that the theoretical average oil consumption is a physical quantity homogeneous with a flow rate, i.e. the units of which correspond to a volume divided by a duration, expressed for example in liters per hour. In addition, the term "theoretical" refers here to oil consumption under nominal conditions, i.e. when the engine is not faulty.

For example, said theoretical average oil consumption is supplied by the company in charge of the design of the engine. Advantageously, the consumption supplied by said company is obtained by a statistical method on the basis of earlier oil consumption statements, so as to increase the robustness and the accuracy of the comparison step 600. Nothing excludes, however, that the theoretical average consumption be determined in another way, for example solely on the basis of the technical specifications of the engine.

As regards the threshold value, this is for example substantially equal, in absolute value, to the product of said theoretical average consumption and the duration separating the measurement times. The fact of not selecting the threshold value exactly equal, in absolute value, to the product of the theoretical average consumption and the duration separating the measurement times allows refining the tolerance sought for taking into account false breakdown detections, or conversely non-detections of an actual breakdown.

According to another example, it is considered that the oil consumption of an engine is negligible outside the cruise phase, so that only the effective duration of flight between the measurement times is taken into consideration in the calculation of the threshold value.

Said comparison consists of evaluating the difference between the gap V and the threshold value. Under nominal operating conditions, such a difference is essentially zero if the threshold value is equal, in absolute value, to the product of said theoretical average consumption and the duration separating the measurement times. On the other hand, in the event of a fuel leak into the oil circuit, the quantity of fluid increases in said oil circuit, which is closed, so that the measurement of the fluid volume at the time subsequent to landing is greater than the measurement of the fluid volume at the time prior to takeoff. Consequently, in the event of a fuel leak into the oil circuit, the difference between the gap V and the threshold value increases in absolute value, thus forming a metric representing the phenomenon considered (fuel leakage into an oil circuit).

The method then includes a step 700 of possibly confirming, based on the result of comparing the gap V with the threshold value, the identity of the engine identified as faulty.

Said step 700 thus consists of testing whether the engine identified as faulty following the step 350 is also identified as faulty on the basis of the difference between the gap V and the threshold value. Typically, if this difference is considered too high, for example by comparing it to yet another threshold value, the engine in question is again identified as faulty, thus confirming the diagnosis obtained following the step 350. A manner of proceeding of this type allows increasing the criticality of the identification resulting from the step 350.

It is thus understood that the method as implemented in FIG. 4, and more particularly the steps 500 to 700, allows performing an additional verification of the possible presence of a fuel leak in an aircraft engine. In the case where the step 700 does not confirm an identification of a fault resulting from the step 350, various scenarios can be considered, such as for example contemplating complementary measurements (pressure, temperature, volume) for reiterating the method.

Moreover, the steps 500, 600 and 700 have been described, with reference to FIG. 4, as being executed successively, consecutively with the identification step 350. Nothing excludes them also being consecutive with the transmission of an alarm message generated by the step 400. Nor does anything exclude having a transmission of a message following the step 700, this being able to include a confirmation or a revocation of a preceding message transmitted during the step 400.

More generally, the fact that all the steps 500, 600 and 700 are consecutive to the identification step 350 constitutes only an implementation variant of the invention. In fact, it is possible to consider that only the possible confirmation step 700 is executed following the identification step 350, the steps 500 and 600 being able, for their part, to be executed in parallel with steps 100, 200, 300 and 350 (and possibly also of the step 400 if appropriate). It is of course understood that an implementation variant of this type is possible provided that the measurement of fluid volume subsequent to landing is acquired at the same time or well before the measurements of the quadruplet, because it must be possible to at least calculate the gap V.

It is also advantageous, when the steps 500 and 600 are executed in parallel with the other steps and indicated above, to iterate the steps 500 and 600 for each engine in the pair. In this manner, carrying out an execution of steps 500 and 600 for an engine which will ultimately not be identified following the step 350 is avoided.

Until now, the invention has been described by considering a single measurement quadruplet as well as a single pair of identical engines. However, no limitation is attached to these parameters.

Thus, in one particular embodiment, several measurement quadruplets are considered. The steps of determination 100, comparison 200 and detection 300, and possibly identification 350 and transmission 400 if appropriate, are then iterated for each of said measurement quadruplets. The fact of performing measurements of pressure and of temperature at several measurement times allows regular checking of the operation of the engines, and thus detecting more rapidly a possible fuel leak into one of the oil circuits.

For example, the measurements of pressure and of temperature are carried out recurrently, using a constant lapse between two measurement times. It is thus possible to accurately track the state of the oil circuits of the engines.

It is also understood that the smaller the time lapse, the easier it is to identify the actual time at which the fuel leakage has occurred, which thus improves feedback and thus also the corrective actions to be contemplated for avoiding other possible fuel leaks.

Nothing excludes, however, according to other examples not detailed here, considering measurements of pressure and of temperature carried out randomly, or even measurements carried out solely during one of the phases of operation (parking, taxiing, flight) of the aircraft using a non-constant lapse.

According to another particular embodiment, possibly in combination with the preceding one in which several measurement quadruplets are considered, several pairs of identical engines are also considered. The steps of determination 100, comparison 200 and detection 300, and possibly of identification 350 and transmission 400 if appropriate, being iterated for each of said pairs.

Purely by way of illustration, let us consider an example in which the aircraft includes four identical engines $M_1$, $M_2$, $M_3$ and $M_4$. It is then possible to consider the pairs ($M_1$, $M_2$), ($M_2$, $M_3$), ($M_3$, $M_4$) and ($M_4$, $M_1$). The fact that each engine is represented in two distinct pairs also allows identifying a faulty engine in the case where a fuel leak occurs. In fact, if a leak is detected during a first iteration of the method for one of the two engines of the pair ($M_1$, $M_2$), then also during a second iteration of the method for one of the engines of the pair ($M_2$, $M_3$), then the engine $M_2$ will be identified as faulty. This identification result can be compared to that of step 350, when it is executed, so as to further increase the robustness of the identification of a faulty engine. In addition, it will appear clearly to a person skilled in the art that other pairs of engines can be considered, such as for example only ($M_1$, $M_2$) and ($M_3$, $M_4$).

A person skilled in the art will also understand that nothing excludes including the steps 500 of determining a gap V, of comparing 600 the gap V with a threshold value, and of possible confirmation 700 in said iterations applying to pairs of identical engines.

The present method for detecting a possible fuel leak into an oil circuit of an aircraft engine can be executed automatically without the intervention of an operator at any step. It can be implemented without limitation, depending on the operational context, within a ground station as described above, within an aircraft, within an autonomous software suite dedicated to monitoring the operation of aircraft engines, or be integrated into a distributed processing chain for monitoring services of the "cloud services" type.

The invention claimed is:

1. A method for detecting a possible fuel leak into an oil circuit of an aircraft engine, said aircraft including at least one pair of identical engines equipped with respective oil circuits, said pair of engines being associated with at least one quadruplet of measurements previously acquired in a measurement time during an operation of the engines of the pair and corresponding to a measurement of pressure and a measurement of temperature of a fluid contained in each of the oil circuits of the engines of the pair, the detection method including:
    a step of determining a quantity Q representative of a possible operating difference between the engines of the pair, based on the measurement quadruplet,
    a step of comparing the quantity Q with a previously determined threshold value, so as to obtain a comparison result,
    a step of detecting a possible fuel leak into the oil circuit of one of the engines of the pair, based on the comparison result,
    a step of identifying a faulty engine among the engines of the pair, said identification step including comparing the measurements of pressure and/or comparing the measurements of temperature of the quadruplet, associated respectively with the engines of the pair; and identifying the faulty engine based on said comparison of the measurements of pressure and/or said comparison of the measurements of temperature, such that a first engine of the pair of engines is identified as the faulty engine when either (i) a first temperature of the quadruplet of measurements associated with the first engine is greater than a second temperature of the quadruplet of measurements associated with a second engine of the pair of engines, or (ii) a first pressure of the quadruplet of measurements associated with the first engine is less than a second pressure of the quadruplet of measurements associated with the second engine,
    a step of transmitting an alarm message in a text format to a display means, said alarm message includes an identifier of the identified faulty engine, wherein an operator on the ground, based on the alarm message, is configured to implement a maintenance operation to repair the identified faulty engine.

2. The method according to claim 1, wherein the step of determining the quantity Q includes:
    calculation of a first quantity $Q_1$ representative of a pressure gap between the two engines, based on the measurements of pressure of the quadruplet,
    calculation of a second quantity $Q_2$ representative of a gap in temperature between the two engines, based on the measurements of temperature of the quadruplet,
    calculation of the quantity Q based on the quantities $Q_1$ and $Q_2$.

3. The method according to claim 2, wherein the quantity Q is calculated according to the following formula:

$$Q=\sqrt{Q_1^2+Q_2^2},$$

$Q_1$ is calculated equal to the difference between the measurements of pressure of the quadruplet,
$Q_2$ is calculated equal to the difference between the measurements of temperature of the quadruplet.

4. The method according to claim 1, including, after the step of determining the quantity Q and before the comparison step, a step of updating the quantity Q in which the updated quantity Q corresponds to an absolute value of the quantity Q previously determined.

5. The method according to claim 1, wherein each engine of the pair is also associated with at least two measurements of fluid volume contained in the oil circuit of said engine of the pair and previously acquired in two distinct respective measurement times, one measurement time prior to the takeoff of the aircraft and one measurement time subsequent to the landing of the aircraft, said method including, for at least one engine of the pair:
    a step of determining a gap between the two measurements of fluid volume associated with said engine,
    a step of comparing the gap with a threshold value determined based on a theoretical average oil consumption of the faulty engine and on a duration separating said distinct measurement times,
    and, following said identification step:
    a step of possible confirmation, based on the result of the comparison of the gap with the threshold value, of the identity of the engine identified as faulty.

6. The method according to claim 1, wherein several measurement quadruplets are considered, at least the steps of determining a quantity Q, of comparing the quantity Q with a threshold value and of detecting a possible leak being iterated for each of said measurement quadruplets.

7. The method according to claim 1, wherein the aircraft includes several pairs of identical engines, at least the steps of determining a quantity Q, of comparing the quantity Q with a threshold value and of detecting a possible leak being iterated for each of said pairs.

8. A non-transitory computer-readable storage medium including a set of program code instructions which, when they are executed by a processor, configure said processor to implement a detection method according to claim 1.

9. The non-transitory computer readable storage medium, on which is recorded a computer program including the set of program instructions according to claim 8.

10. A processing device for detecting a possible fuel leak into an oil circuit of an aircraft engine, said aircraft including at least one pair of identical engines equipped with respective oil circuits, said pair of engines being associated with at least one quadruplet of measurements previously acquired at a same measurement instant during an operation of the engines of the pair and corresponding to a measurement of pressure and a measurement of temperature of a fluid contained in each of the oil circuits of the engines of the pair, the processing device including:
    a determination module, configured to determine a quantity Q representative of a possible operating difference between the engines of the pair, based on the measurement quadruplet,
    a comparison module, configured to compare the quantity Q with a previously determined threshold value, so as to obtain a comparison result,
    a detection module, configured to detect a possible fuel leak into the oil circuit of one of the engines of the pair, based on the comparison result, wherein the detection module is further configured to identify a faulty engine among the engines of the pair by comparing the measurements of pressure and/or comparing the measurements of temperature of the quadruplet, associated respectively with the engines of the pair; and identifying the faulty engine based on said comparison of the measurements of pressure and/or said comparison of the measurements of temperature such that a first engine of the pair of engines is identified as the faulty engine when either (i) a first temperature of the quadruplet of measurements associated with the first engine is greater than a second temperature of the quadruplet of measurements associated with a second engine of the pair of engines, or (ii) a first pressure of the quadruplet of measurements associated with the first engine is less than a second pressure of the quadruplet of measurements associated with the second engine,
    a display means configured to display a transmitted alarm message, wherein the alarm message includes an identifier of the identified faulty engine, and wherein an operator on the ground, based on the alarm message, is configured to implement a maintenance operation to repair the identified faulty engine.

11. The device according to claim 10, each engine of the pair also being associated with at least two measurements of fluid volume contained in the oil circuit of said engine of the pair and previously acquired in two respective distinct measurement times during the operation of the aircraft, a measurement time prior to the takeoff of the aircraft and a measurement time subsequent to the landing of the aircraft, said device including:
    a determination module, configured to determine a gap between the two measurements of fluid volume associated with one engine of the pair,
    a comparison module, configured to compare the gap with a threshold value determined based on a theoretical average oil consumption of the faulty engine and on a duration separating said distinct measurement times,
    a confirmation module, configured to confirm, based on the result of comparing the gap with the threshold value, the identity of the engine identified as faulty.

12. A system for detecting a possible fuel leak into an oil circuit of an aircraft engine, said aircraft including at least one pair of identical engines equipped with respective oil circuits, said detection system including:
    acquisition means configured to acquire at least one measurement quadruplet in one measurement time during the operation of the engines of the pair and corresponding to a measurement of pressure and a measurement of temperature of the fluid contained in each of the oil circuits of the engines of the pair,
    a processing device conforming to claim 10,
    means of communicating the measurement quadruplet to the processing device.

13. The system according to claim 12, said acquisition means also being configured to acquire, for each engine of the pair, at least two measurements of fluid volume contained in the oil circuit of said engine in two distinct measurement times during the operation of the aircraft, one measurement time prior to the takeoff of the aircraft and one measurement time subsequent to the landing of the aircraft, said processing device including:
    an identification module configured, when a leak is detected, to:
        compare the measurements of pressure and/or the measurements of temperature of the quadruplet associated respectively with the engines of the pair,
        identify a faulty engine based on said comparison of the measurements of pressure and/or said comparison of the measurements of temperature,
    a determination module, configured to determine a gap between the two measurements of fluid volume associated with one engine of the pair,
    a comparison module, configured to compare the gap with a threshold value determined based on a theoretical average oil consumption of the faulty engine and on a duration separating said distinct measurement times, and
    a confirmation module, configured to confirm, based on the result of comparing the gap with the threshold value, the identity of the engine identified as faulty, and
    the communication means also being configured to transmit the measurements of the fluid volume to the processing device.

14. An aircraft including a detection system according to claim 12.

* * * * *